United States Patent
Lyu et al.

(10) Patent No.: US 12,260,759 B2
(45) Date of Patent: Mar. 25, 2025

(54) PARKING SPOT IDENTIFICATION AND ANNOTATION

(71) Applicant: Volvo Car Corporation, Gothenburg (SE)

(72) Inventors: Yecheng Lyu, Mountain View, CA (US); Sihao Ding, Sunnyvale, CA (US)

(73) Assignee: Volvo Car Corporation, Gothenburg (SE)

( * ) Notice: Subject to any disclaimer, the term of this patent is extended or adjusted under 35 U.S.C. 154(b) by 62 days.

(21) Appl. No.: 18/300,705

(22) Filed: Apr. 14, 2023

(65) Prior Publication Data

US 2024/0346930 A1 Oct. 17, 2024

(51) Int. Cl.
*G08G 1/14* (2006.01)
*G06V 20/58* (2022.01)

(52) U.S. Cl.
CPC .......... *G08G 1/143* (2013.01); *G06V 20/586* (2022.01)

(58) Field of Classification Search
CPC .......................... G08G 1/143; G06V 20/586
See application file for complete search history.

(56) References Cited

U.S. PATENT DOCUMENTS

| | | | | |
|---|---|---|---|---|
| 10,636,305 B1 * | 4/2020 | Schmidt | ............... | G08G 1/143 |
| 2009/0243889 A1 * | 10/2009 | Suhr | ............... | G08G 1/168 |
| | | | | 340/932.2 |
| 2012/0260959 A1 * | 10/2012 | Leavitt | ............... | E04H 15/20 |
| | | | | 135/96 |
| 2014/0176718 A1 * | 6/2014 | Kim | ............... | G06V 20/58 |
| | | | | 348/148 |
| 2016/0284217 A1 * | 9/2016 | Lee | ............... | B62D 15/0285 |
| 2017/0046955 A1 * | 2/2017 | Shen | ............... | G08G 1/143 |
| 2017/0092130 A1 * | 3/2017 | Bostick | ............... | G08G 1/015 |
| 2017/0177956 A1 * | 6/2017 | Zhang | ............... | G06V 10/753 |
| 2018/0025640 A1 * | 1/2018 | Micks | ............... | G06N 3/08 |
| | | | | 340/932.2 |
| 2019/0332893 A1 * | 10/2019 | Roy Chowdhury | ............... | G06F 18/2163 |
| 2019/0392229 A1 * | 12/2019 | Yamamoto | ............... | G06V 20/586 |
| 2020/0089974 A1 * | 3/2020 | Ding | ............... | G06V 10/82 |
| 2020/0090516 A1 * | 3/2020 | Sert | ............... | G08G 1/141 |
| 2020/0090519 A1 * | 3/2020 | Ding | ............... | G08G 1/168 |
| 2020/0193188 A1 * | 6/2020 | Okada | ............... | G06V 30/414 |

(Continued)

OTHER PUBLICATIONS

"SAE J3016TM Levels of Driving Automation" SAE International, https://www.sae.org/binaries/content/assets/cm/content/blog/sae-j3016-visual-chart_5.3.21.pdf, Last Accessed Mar. 28, 2023, 1 page.

*Primary Examiner* — Chico A Foxx
(74) *Attorney, Agent, or Firm* — Amin, Turocy & Watson, LLP

(57) ABSTRACT

Various systems and methods are presented regarding utilizing technology onboard a vehicle to identify and annotate a vehicle parking spot. The parking spot is identified in a digital image captured by an onboard camera and imaging system, wherein an image including the parking spot can be annotated with a shape identifying the parking spot and further annotated with information regarding the parking spot, e.g., dimensions of the parking spot, an entrance to the parking spot, whether the parking spot is occupied, a location of the parking spot, and suchlike. The parking spot information can be transmitted to a remotely located vehicle and/or a remotely located computer system configured to compile information regarding the parking spot.

20 Claims, 11 Drawing Sheets

(56) References Cited

U.S. PATENT DOCUMENTS

| | | | |
|---|---|---|---|
| 2020/0238979 A1* | 7/2020 | Woo | B62D 15/0285 |
| 2021/0300337 A1* | 9/2021 | Fujitani | G08G 1/143 |
| 2022/0153259 A1* | 5/2022 | Suddamalla | G06T 7/20 |
| 2022/0379876 A1* | 12/2022 | Obora | G06V 20/586 |
| 2023/0146185 A1* | 5/2023 | Ho | G06V 20/586 |
| | | | 382/103 |
| 2024/0109412 A1* | 4/2024 | Matsunaga | B60K 28/02 |
| 2024/0246529 A1* | 7/2024 | Wang | B60W 30/06 |

* cited by examiner

SAE J3016™ LEVELS OF DRIVING AUTOMATION 2018-06

| | LEVEL 0 | LEVEL 1 | LEVEL 2 | LEVEL 3 | LEVEL 4 | LEVEL 5 |
|---|---|---|---|---|---|---|
| What does the human in driver's seat have to do? | You *are* driving whenever these driver support features are engaged – even if your feet are off the pedals and you are not steering ⟵⟶ You must constantly supervise these support features; you must steer, brake or accelerate as needed to maintain safety | | | You *are not* driving whenever these automated driving features are engaged – even if you are seated in "the driver's seat" ⟵⟶ When the feature requests, you must drive | These automated driving features will not require you to take over driving | |
| What do these features do? | These are driver support features | | | These are automated driving features | | |
| | These features are limited to providing warnings and momentary assistance | These features provide steering OR brake/ acceleration support to the driver | These features provide steering AND brake/ acceleration support to the driver | These features can drive the vehicle under limited conditions and will not operate unless all required conditions are met | | This feature can drive the vehicle under all conditions |
| Example Features | • automatic emergency braking<br>• blind spot warning<br>• lane departure warning | • lane centering OR<br>• adaptive cruise control | • lane centering AND<br>• adaptive cruise control at the same time | • traffic jam chauffeur | • local driverless taxi<br>• pedals/ steering wheel may or may not be installed | • same as level 4, but feature can drive everywhere in all conditions |

FIG. 12 (Prior Art)

PARKING SPOT IDENTIFICATION AND ANNOTATION

TECHNICAL FIELD

This application relates to techniques facilitating automated detection and annotation of a parking spot.

BACKGROUND

Identifying a parking spot and its availability is an issue that continuously faces drivers, whereby a driver may drive streets aimlessly in search of an available spot, while a spot may be available locally on a street that the driver has yet to navigate. Further, another driver may be navigating a nearby street that has the available space on it, and yet currently available data systems in vehicles are not directed towards sharing knowledge of street conditions, e.g., parking spot presence and availability, with other drivers. Further, as the onboard intelligence of vehicles increases, regardless of whether a vehicle is being operated manually, partially autonomously, or fully autonomously, advantage could be taken of the available onboard intelligence and associated sensors (e.g., onboard sensors and cameras) to identify available parking locations to share with other drivers/ autonomous vehicles. Detection of a parking spot can be hindered by parked vehicles occluding a field-of-view of imaging systems (e.g., digital cameras) onboard a vehicle driving by one or more parking spots.

The above-described background is merely intended to provide a contextual overview of some current issues and is not intended to be exhaustive. Other contextual information may become further apparent upon review of the following detailed description.

SUMMARY

The following presents a summary to provide a basic understanding of one or more embodiments described herein. This summary is not intended to identify key or critical elements, or delineate any scope of the different embodiments and/or any scope of the claims. The sole purpose of the summary is to present some concepts in a simplified form as a prelude to the more detailed description presented herein.

In one or more embodiments described herein, systems, devices, computer-implemented methods, methods, apparatus and/or computer program products are presented to facilitate detection and annotation of a parking spot and its availability regarding being unoccupied or occupied by utilizing one or more systems/technologies located onboard a vehicle.

The system can comprise a memory that stores computer executable components and a processor that executes the computer executable components stored in the memory. In an embodiment, the computer executable components can comprise a parking spot detection component configured to identify a parking spot, wherein the parking spot is identified based on at least one digital image captured by at least one sensor located onboard the vehicle. In an embodiment, the vehicle can be operating in one of a partially autonomous manner, a fully autonomous manner, or operated by a human driver.

In a further embodiment, the at least one sensor can comprise at least one camera configured to capture digital imagery of an environment in which the vehicle is operating, and the imagery comprises a 360 degree field of view around the vehicle. In an embodiment, the at least one camera can comprise a fish-eye lens camera.

In a further embodiment, the computer executable components can further comprise an image component configured to receive the digital imagery captured by the at least one camera, wherein the at least one camera comprises a group of cameras. In a further embodiment, the image component can be configured to stitch digital images respectively received from each camera in the group of cameras, wherein the digital images are stitched to form the 360 degree field of view around the vehicle. In another embodiment, the image component can be further configured to transmit the stitched digital image to the parking spot detection component, wherein the parking spot detection component can be further configured to receive the stitched digital images, identify a parking spot within the stitched digital images, and annotate the parking spot. In another embodiment, the parking spot detection component can be further configured to annotate the parking spot by identifying a first marker indicating a first side of the parking sport, identifying a second marker indicating a second side of the parking spot, drawing a first line in the digital imagery to digitally connect the first marker to the second marker, wherein the first line indicates a first side of the parking spot, and drawing a rectangle over the parking spot, wherein the rectangle comprises four sides, wherein the first line is a first side of the rectangle indicating an entrance of the parking spot, the first marker is a second side of the rectangle, the second marker is a third side of the rectangle, wherein the second side of the rectangle and third side of the rectangle are on opposite sides of the rectangle, and fourth side of the rectangle indicates a rear portion of the parking lot, wherein the width of the rectangle is defined by the length of the first line, and the depth of the rectangle is at least the width of the rectangle.

In another embodiment, the parking spot detection component can comprise a neural network configured to identify the first marker and the second marker, draw the rectangle over the parking spot, and annotate the rectangle with at least one of: an entrance point defined at the first side of the rectangle; a width of the rectangle based on the length of the first side; a depth of the rectangle based on at least the width of the rectangle; or a location of the parking spot, wherein the location of the parking spot is based on GPS data received at the image component.

In a further embodiment, the parking spot detection component can be further configured to determine a presence of a vehicle in the parking spot, wherein in response to a determination of no vehicle being detected in the parking spot, the image component is further configured to indicate on the rectangle that the parking spot is available, while in response to a determination of a vehicle is currently in the parking spot, the image component is further configured to indicate on the rectangle that the parking spot is not available.

In another embodiment, the parking spot detection component can be further configured to transmit the annotated rectangle to a communication component, wherein the communication component is further configured to transmit the annotated rectangle to a remotely located computer system, wherein the remotely located computer system can be one of a computing system onboard a second vehicle or a central computer system configured to compile parking spot information for a particular region.

In a further embodiment, the parking spot detection component can be configured to identify the first marker and the second marker and draw the rectangle over the parking spot based on training data comprising digital images having respective parking spots identified thereon.

In other embodiments, elements described in connection with the disclosed systems can be embodied in different forms such as computer-implemented methods, computer program products, or other forms. For example, in an embodiment, a computer-implemented method can be utilized for detecting, on a digital image, a first end point of a first parking space marker; detecting, on the digital image, a second end point of a second parking space marker; drawing a line, on the digital image, connecting the first end point to the second end point; and drawing a 2-dimensional shape, on the digital image, wherein the line forms a side of the shape, and the width of the shape is the length of the connecting line. In another embodiment, the computer-implemented method can further comprise extending drawing of the shape into the parking space defined by the first parking space marker and the second parking space marker, wherein the 2-dimensional shape is a rectangle and the length of the rectangle is set to a predefined distance.

In another embodiment, a computer program product comprising a computer readable storage medium having program instructions embodied therewith, the program instructions executable by a processor, causing the processor to detect, on a digital image, a first end point of a first parking space marker; detect, on the digital image, a second end point of a second parking space marker; draw a line, on the digital image, connecting the first end point to the second end point; and draw a rectangle on the digital image, wherein the line forms a side of the shape, the width of the shape is the length of the connecting line, and the rectangle extends by a predefined distance into the parking space defined by the first parking space marker and the second parking space marker.

An advantage of the one or more systems, computer-implemented methods and/or computer program products can be utilizing various systems and technologies located on a vehicle to identify and annotate parking spots in digital images, thereby enabling information to be collected regarding parking location/availability for use by the vehicle or by other vehicles/external systems.

DESCRIPTION OF THE DRAWINGS

One or more embodiments are described below in the Detailed Description section with reference to the following drawings.

FIG. 12 presents TABLE 1200 presenting a summary of SAE J3016 detailing respective functions and features during Levels 0-5 of driving automation (per June 2018).

DETAILED DESCRIPTION

Figure 1:
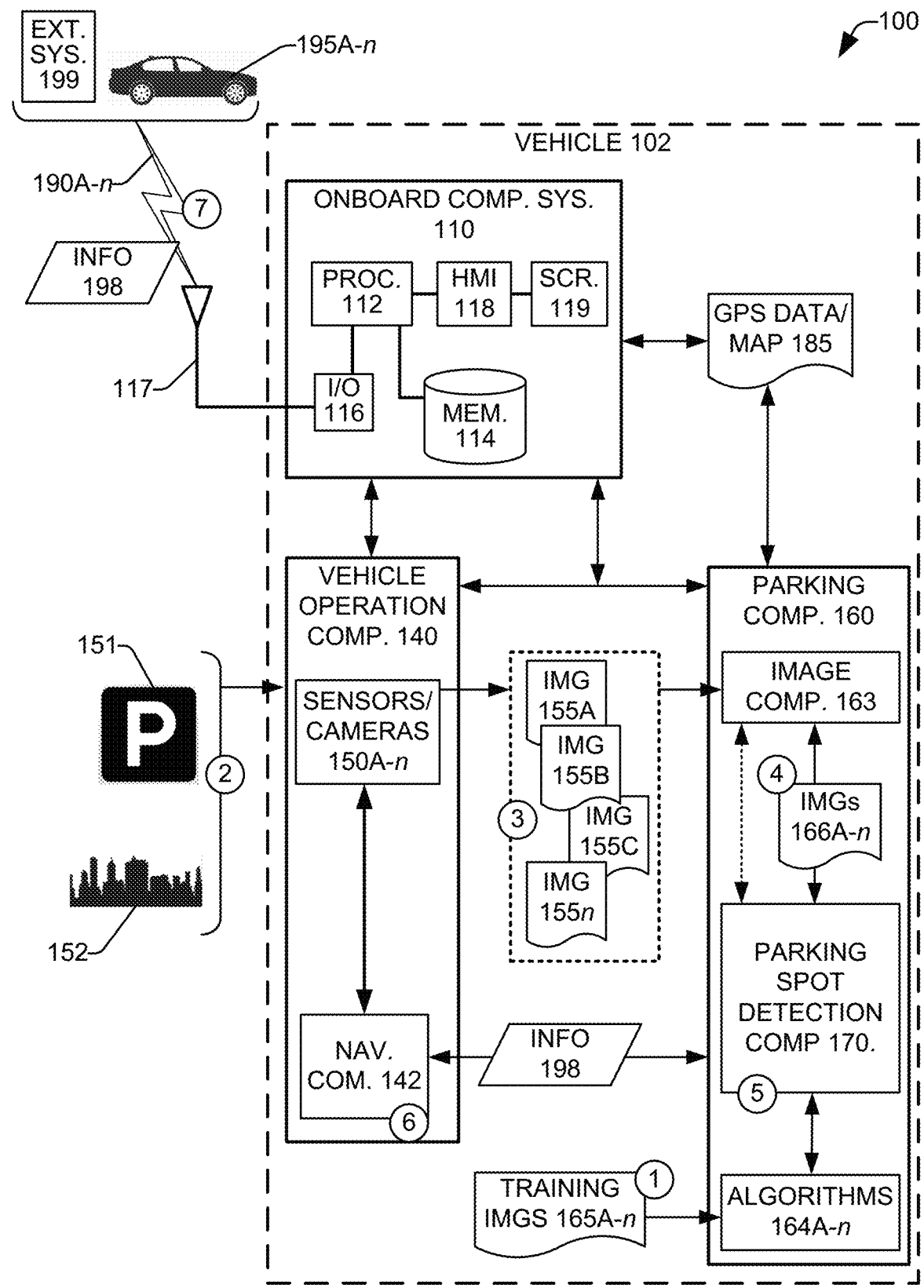
FIG. 1 illustrates a system that can be utilized by a vehicle to identify one or more parking spots and further determine availability of the one or more parking spots, in accordance with one or more embodiments.

The following detailed description is merely illustrative and is not intended to limit embodiments and/or application or uses of embodiments. Furthermore, there is no intention to be bound by any expressed and/or implied information presented in any of the preceding Background section, Summary section, and/or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that when an element is referred to as being "coupled" to another element, it can describe one or more different types of coupling including, but not limited to, chemical coupling, communicative coupling, electrical coupling, electromagnetic coupling, operative coupling, optical coupling, physical coupling, thermal coupling, and/or another type of coupling. Likewise, it is to be understood that when an element is referred to as being "connected" to another element, it can describe one or more different types of connecting including, but not limited to, electrical connecting, electromagnetic connecting, operative connecting, optical connecting, physical connecting, thermal connecting, and/or another type of connecting.

As used herein, "data" can comprise metadata. Further, ranges A-n are utilized herein to indicate a respective plurality of devices, components, signals etc., where n is any positive integer.

In the various embodiments presented herein, the disclosed subject matter can be directed to (i) identifying a parking spot (also known as a parking space, a parking location), (ii) annotating the parking spot, (iii) determining whether the parking spot is occupied/unavailable or unoccupied/available, and further (iv) making the information collected regarding the parking spot available to other drivers/vehicles, as well as remotely located computer-based systems such as a parking management system for a parking lot (e.g., a multi-story parking lot proximate to a hotel, and suchlike).

Identification of a parking spot can be achieved via various cameras and other sensors onboard a vehicle that is being navigated along a street, road, avenue, in a parking lot, and suchlike. The onboard cameras, etc., can capture imagery (e.g., digital images, digital photos) of the vehicle's surroundings/operating environment, wherein the captured imagery can be processed, e.g., by an image processing system and computer software/algorithms located on the vehicle (e.g., various onboard systems and sensors, including one or more computer implemented algorithms (including vision algorithms)). In an embodiment, the image processing can entail stitching together a set of related images to create a composite image comprising multiple fields of view. Further image processing can be undertaken to identify one or more parking spots within each composite image, and further identify whether the sport is unoccupied and available for parking or a vehicle is currently parked in the parking spot, rendering the parking spot unavailable/occupied. An identified parking spot in an image can be annotated with an entrance to the parking spot. Further, the image processing can facilitate annotating/labelling/identifying the parking spot with regard to its current state, e.g., available (annotated in green, for example) or unavailable (annotated in red, for example), and further the location of the parking spot, e.g., location on a street, within a parking lot, etc. Location of the parking spot can be supplemented by navigational/location data, such as GPS/satellite-based navigation data. Other information can be generated by the image processing such as the dimensions of the spot, e.g., regarding the width, length, overhead height of the spot, wherein the information can be made available to other vehicles that may be currently requiring a parking location, and the size constraints of particular spots regarding the size limitations of a vehicle (e.g., compact car, sports utility vehicle (SUV) and suchlike) that can park in an available spot, as well as any requirements/constraints regarding parking in the spot (e.g., parallel parking required, parking spot is located on a narrow street, and suchlike).

As mentioned, the parking spot information can be made available to other vehicles as well as a remotely located computer-based system. In an embodiment, the onboard imaging system can be configured to collect/compile/digitally stitch the digital images and transmit the digital images to the remotely located computer-based system, wherein the remotely located system can be configured to (i) identify and annotate the parking spots in the digital images received from the vehicle, (ii) compile the identified spots into a map of parking spots in a region (e.g., across a city), (iii) forward parking spot location and current availability to other vehicles operating in the region, and suchlike. In another embodiment, information regarding the parking spot identification, annotation, location, availability, etc., can be generated by a vehicle's onboard computer system and then transmitted to other vehicles and/or remote computer systems.

As previously mentioned, the vehicle can be operated by a human operator (e.g., a driver) as well as the vehicle operating in a partially autonomous manner through to fully autonomous manner. It is to be appreciated that while the various embodiments presented herein are directed to a vehicle navigating a road/parking lot (e.g., an automobile), the various embodiments can be applied to any object engaged in determination of availability of a particular spot and/or space, and further annotate the spot/space, e.g., by one or more boats in a marina, and suchlike.

Regarding the phrase "autonomous" operation, to enable the level of sophistication of operation of a vehicle to be defined across the industry by both suppliers and policymakers, standards are available to define the level of autonomous operation. For example, the International Standard J3016 Taxonomy and Definitions for Terms Related to Driving Automation Systems for On-Road Motor Vehicles has been developed by the Society of Automotive Engineers (SAE) and defines six levels of operation of a driving automation system(s) that performs part or all of the dynamic driving task (DDT) on a sustained basis. The six levels of definitions provided in SAE J3016 range from no driving automation (Level 0) to full driving automation (Level 5), in the context of vehicles and their operation on roadways. Levels 0-5 of SAE J3016 are summarized below and further presented in FIG. 12, Table 1200.

Level 0 (No Driving Automation): At Level 0, the vehicle is manually controlled with the automated control system (ACS) having no system capability, the driver provides the DDT regarding steering, braking, acceleration, negotiating traffic, and suchlike. One or more systems may be in place to help the driver, such as an emergency braking system (EBS), but given the EBS technically doesn't drive the vehicle, it does not qualify as automation. The majority of vehicles in current operation are Level 0 automation.

Level 1 (Driver Assistance/Driver Assisted Operation): This is the lowest level of automation. The vehicle features a single automated system for driver assistance, such as steering or acceleration (cruise control) but not both simultaneously. An example of a Level 1 system is adaptive cruise control (ACC), where the vehicle can be maintained at a safe distance behind a lead vehicle (e.g., operating in front of the vehicle operating with Level 1 automation) with the driver performing all other aspects of driving and has full responsibility for monitoring the road and taking over if the assistance system fails to act appropriately.

Level 2 (Partial Driving Automation/Partially Autonomous Operation): The vehicle can (e.g., via an advanced driver assistance system (ADAS)) steer, accelerate, and brake in certain circumstances, however, automation falls short of self-driving as tactical maneuvers such as responding to traffic signals or changing lanes can mainly be controlled by the driver, as does scanning for hazards, with the driver having the ability to take control of the vehicle at any time.

Level 3 (Conditional Driving Automation/Conditionally Autonomous Operation): The vehicle can control numerous aspects of operation (e.g., steering, acceleration, and suchlike), e.g., via monitoring the operational environment, but operation of the vehicle has human override. For example, the autonomous system can prompt a driver to intervene when a scenario is encountered that the onboard system cannot navigate (e.g., with an acceptable level of operational safety), accordingly, the driver must be available to take over operation of the vehicle at any time.

Level 4 (High Driving Automation/High Driving Operation): advancing on from Level 3 operation, while under Level 3 operation the driver must be available, with Level 4, the vehicle can operate without human input or oversight but only under select conditions defined by factors such as road type, geographic area, environments limiting top speed (e.g., urban environments), wherein such limited operation is also known as "geofencing". Under Level 4 operation, a human (e.g., driver) still has the option to manually override automated operation of the vehicle.

Level 5 (Full Driving Automation/Full Driving Operation): Level 5 vehicles do not require human attention for operation, with operation available on any road and/or any road condition that a human driver can navigate (or even beyond the navigation/driving capabilities of a human). Further, operation under Level 5 is not constrained by the geofencing limitations of operation under Level 4. In an embodiment, Level 5 vehicles may not even have steering wheels or acceleration/brake pedals. In an example of use, a destination is entered for the vehicle (e.g., by a passenger, by a supply manager where the vehicle is a delivery vehicle, and suchlike), wherein the vehicle self-controls navigation and operation of the vehicle to the destination.

To clarify, operations under levels 0-2 can require human interaction at all stages or some stages of a journey by a vehicle to a destination. Operations under levels 3-5 do not require human interaction to navigate the vehicle (except for under level 3 where the driver is required to take control in response to the vehicle not being able to safely navigate a road condition).

As referenced herein, DDT relates to various functions of operating a vehicle. DDT is concerned with the operational function(s) and tactical function(s) of vehicle operation, but may not be concerned with the strategic function. Operational function is concerned with controlling the vehicle motion, e.g., steering (lateral motion), and braking/acceleration (longitudinal motion). Tactical function (aka, object and event detection and response (OEDR)) relates to the navigational choices made during a journey to achieve the destination regarding detecting and responding to events and/or objects as needed, e.g., overtake vehicle ahead, take the next exit, follow the detour, and suchlike. Strategic function is concerned with the vehicle destination and the best way to get there, e.g., destination and way point planning. Regarding operational function, a Level 1 vehicle under SAE J3016 controls steering or braking/acceleration, while a Level 2 vehicle must control both steering and braking/acceleration. Autonomous operation of vehicles at Levels 3, 4, and 5 under SAE J3016 involves the vehicle having full control of the operational function and the tactical function. Level 2 operation may involve full control of the operational function and tactical function but the driver is available to take control of the tactical function.

Accordingly, the term "autonomous" as used herein regarding operation of a vehicle with or without a human available to assist the vehicle in self-operation during navigation to a destination, can relate to any of Levels 1-5. In an embodiment, for example, the terms "autonomous operation" or "autonomously" can relate to a vehicle operating at least with Level 2 operation, e.g., a minimum level of operation is Level 2: partially autonomous operation, per SAE J3016. Hence, while Level 2, partially autonomous operation, may be a minimum level of operation, higher levels of operation, e.g., Levels 3-5, are encompassed in operation of the vehicle at Level 2 operation. Similarly, a minimum Level 3 operation encompasses Levels 4-5 operation, and minimum Level 4 operation encompasses operation under Level 5 under SAE J3016.

It is to be appreciated that while the various embodiments presented herein are directed towards to one or more vehicles (e.g., vehicle 102) operating in an autonomous manner (e.g., as an AV), the various embodiments presented herein are not so limited and can be implemented with a group of vehicles operating in any of an autonomous manner (e.g., Level 5 of SAE J3016), a partially autonomous manner (e.g., Level 1 of SAE J3016 or higher), or in a non-autonomous manner (e.g., Level 0 of SAE J3016). For example, a first vehicle can be operating in an autonomous manner (e.g., any of Levels 3-5), a partially autonomous manner (e.g., any of levels 1-2), or in a non-autonomous manner (e.g., Level 0), while another vehicle (e.g., vehicle(s) 195A-$n$) can also be operating in any of an autonomous manner, a partially autonomous manner, or in a non-autonomous manner.

Turning now to the drawings, FIG. 1 illustrates a system 100 that can be utilized by a vehicle to identify/annotate one or more parking spots and further determine availability of the one or more parking spots, in accordance with one or more embodiments. System 100 comprises a vehicle 102 with various devices and components located thereon, such as an onboard computer system (OCS) 110. The OCS 110 can be utilized to provide overall operational control and/or operation of the vehicle 102. In an embodiment, the OCS 110 can be a vehicle control unit (VCU), for example, as utilized to control/monitor operation of an autonomous vehicle (AV), a semi-autonomous vehicle, and suchlike. In an embodiment, the OCS 110 can be configured to operate/control/monitor various vehicle operations, wherein the various operations can be controlled by one or more vehicle operation components 140 communicatively coupled to the OCS 110. The various vehicle operation components 140 can include a navigation component 142 configured to navigate vehicle 102 along a road as well as to control/assist steering of the vehicle 102, e.g., into a parking spot. While not shown, the vehicle operation components 140 can further comprise an engine component configured to control operation, e.g., start/stop, of an engine configured to propel the vehicle 102; an acceleration component configured to propel the vehicle 102; and a braking component configured to slow down or stop the vehicle 102; wherein the respective components can be utilized to drive/stop vehicle 102, e.g., into an available parking spot.

The vehicle operation components 140 can further comprise various sensors and/or cameras 150A-$n$ configured to monitor operation of vehicle 102 and further obtain imagery and other information regarding an environment/surroundings the vehicle 102 is operating in. The sensors/cameras 150A-$n$ can include any suitable detection/measuring device, including cameras, optical sensors, laser sensors, Light Detection and Ranging (LiDAR) sensors, sonar sensors, audiovisual sensors, perception sensors, road lane sensors, motion detectors, velocity sensors, and the like, as employed in such applications as simultaneous localization and mapping (SLAM), and other computer-based technologies and methods utilized to determine an environment being navigated by vehicle 102 and the location of the vehicle 102 within the environment (e.g., location mapping). In an embodiment, cameras 150A-$n$ can be a wide-angle/ultra wide-angle lens cameras, such as a fisheye lens cameras, configured to capture a wide panorama of view. Accordingly, by utilizing, for example, four fisheye lens cameras 150A-D, respectively pointing forwards (e.g., with a forward field-of-view), rearward (e.g., with a rearward field-of-view), left (e.g., with a left-side/port field-of-view), and/or right (e.g., with a right-side/starboard field-of-view) from the vehicle 102, the surroundings of vehicle 102 can be captured by various digital images/imagery 155A-$n$, aka, fisheye images. For example, the surroundings/operational environment of vehicle 102 can be a parking lot/car park 151, city streets 152, and suchlike, being navigated by vehicle 102. While the various digital images/imagery 155A-$n$ may have a degree of distortion owing to the physics/mechanics of a fisheye lens, image processing/manipulation can be undertaken at the cameras 150A-$n$ (as well as at an image component 163, as further described) to mitigate effects resulting from the distortion. Digital images, data, and the like generated by sensors/cameras 150A-*n* can be analyzed by algorithms 164A-*n* trained to identify respective features of interest such as a parking spot, wherein algorithms 164A-*n* can be pre-trained with training images 165A-*n* comprising parking spots.

As shown, vehicle 102 can further include parking component 160, wherein the parking component 160 can further comprise various components that can be utilized to identify one or more parking spots in the surroundings of the vehicle 102. As shown in FIG. 1, the parking component 160 can be communicatively coupled to the OCS 110, the vehicle operation components 140, and other components located on board vehicle 102.

An image component 163 can be included in the parking component 160, wherein the image component 163 can be configured to process images 155A-*n* as required for subsequent parking spot identification to be performed. In an embodiment, the image component 163 can be configured to stitch/combine together associated images 155A-*n* received from the cameras 150A-*n*. For example, the images 155A-*n* can be provided in sets/groups with an identifier indicating the respective images 155A-*n* to be stitched together to form a digital image, e.g., birds eye view image (BEVi) 166, as a composite of images 155A-*n*. For example, the identifier can be a timestamp that identifies the set of respective images respectively captured by the cameras 150A-*n* (e.g., camera 150A is a forward view camera, camera 150B is a rearward view camera, camera 150C is a left-side camera, and camera 150D is a right-side camera), such that image 155A is the forward view digital image, image 155B is the rearward view image, image 155C is the left-side image, and image 155D is the right-side image). As shown in FIG. 1, the image component stitches images 155A-D to create the BEVi 166, wherein the BEVi 166 can have associated metadata including the timestamp of when the images 155A-D were captured/generated.

The parking component 160 can further include a parking spot detection component (PSDC) 170 configured to receive the BEVi 166 from the image component 163. The PSDC 170 can be configured to identify and/or annotate parking spots in the BEVi 166, wherein PSDC 170 can include various algorithms 164A-*n* (e.g., comprising one or more neural networks) which can provide artificial intelligence (AI) capabilities to PSDC 170. In an embodiment, to enable identification of one or more parking spots in BEVi 166, the algorithms 164A-*n* can be previously trained with training images 165A-*n*. As further described herein, a parking spot can be identified based upon parking spot lines/markers. The parking component 160 can further receive information from a GPS data/map system 185. In an embodiment, the information received from the GPS system 185 can be utilized to identify a direction of travel of vehicle 102 at the time the images 155A-*n* were generated, wherein the subsequently generated BEVi 166 can be annotated with the direction of travel information to further assist determination of parking spots and their respective alignment (e.g., what side of street/where in the parking lot the parking spots are located).

Algorithms 164A-*n* can include a computer vision algorithm(s) and/or a digital imagery algorithm(s), and suchlike, to enable the respective determinations of parking spots, per the various embodiments presented herein.

As shown in FIG. 1, the OCS 110 can further include a processor 112 and a memory 114, wherein the processor 112 can execute the various computer-executable components, functions, operations, etc., presented herein. The memory 114 can be utilized to store the various computer-executable components, functions, code, etc., as well as images 155A-*n*, BEVi's 166A-*n*, information regarding parking spots (e.g., location, dimensions, occupied/unoccupied, entrance point, algorithms 164A-*n*, training data used for algorithms 164A-*n*, annotations, information (e.g., motion, trajectory) regarding vehicle 102, and suchlike. In an embodiment, the parking component 160 can form a standalone component communicatively coupled to the OCS 110, and while not shown, the parking component 160 can operate in conjunction with a processor (e.g., functionally comparable to processor 112) and a memory (e.g., functionally comparable to memory 114) to enable identification/annotation of parking spots in digital images BEVi 166A-*n*. In a further embodiment, the OCS 110, vehicle operation components 140, and parking component 160 (and respective sub-components) can operate using a common processor (e.g., processor 112) and memory (e.g., memory 114).

As further shown, the OCS 110 can include an input/output (I/O) component 116, wherein the I/O component 116 can be a transceiver configured to enable transmission/receipt of information 198 (e.g., BEVi 166 with a parking spot identified thereon in conjunction with various annotations, and the like) between the OCS 110 and any remotely located system(s) 199, an onboard system of one or more other vehicles 195A-*n*, and suchlike. I/O component 116 can be communicatively coupled, via an antenna 117, to the remotely located devices and systems (e.g., other vehicles 195A-*n*, external system 199). Transmission of data and information between the vehicle 102 (e.g., via antenna 117 and I/O component 116) and the remotely located devices and systems can be via the signals 190A-*n*. Any suitable technology can be utilized to enable the various embodiments presented herein, regarding transmission and receiving of signals 190A-*n*. Suitable technologies include BLUETOOTH®, cellular technology (e.g., 3G, 4G, 5G), internet technology, ethernet technology, ultra-wideband (UWB), DECAWAVE®, IEEE 802.15.4a standard-based technology, Wi-Fi technology, Radio Frequency Identification (RFID), Near Field Communication (NFC) radio technology, and the like.

In an embodiment, the OCS 110 can request from remotely located devices and systems (e.g., other vehicles 195A-*n*, external system 199) any information the remotely located devices and systems may have regarding the parking spot (e.g., cost of parking, disability spots, parking time restrictions, and suchlike). The OCS 110 can forward the received information 198 the PSDC 170, such that the PSDC 170 can further annotate the BEVi 166 with the received information.

In an embodiment, the OCS 110 can further include a human-machine interface (HMI) 118 (e.g., a display, a graphical-user interface (GUI)) which can be configured to present various information including imagery (e.g., images 155A-*n*, BEVi's 166A-*n*)/information regarding parking spots, per the various embodiments presented herein. The HMI 118 can include an interactive display 119 to present the various information via various screens presented thereon, and further configured to facilitate input of information/settings/etc., regarding operation of the vehicle 102. In an embodiment, a screen 119 can include a touch-activated button that can initiate transmission and/or reception of information 198 to/from vehicle 102, e.g., to obtain further information from the external system 199 regarding the parking spots.

As shown on FIG. 1, an example/representative sequence of events can be followed:

1) algorithms 164A-$n$ (e.g., a neural network) are trained with training images 165A-$n$ that include identified parking spots and annotations. Wherein training can include establishing parking spot markers, their respective end points, connecting line, and construction of a shape to define a parking spot, as well as occupied/unoccupied.
2) Cameras and sensors 150A-$n$ onboard vehicle 102 can capture imagery of parking lots 151 as well as city streets 152.
3) More than one camera 150A-$n$ can be utilized to enable capturing images from around the vehicle 102, whereby images 155A-$n$ can be captured at any given time by the respective cameras 150A-$n$.
4) the image component 163 in a parking component 160 can be configured to generate a BEVi 166 from the various images 155A-$n$.
5) the PSDC 170 can, in conjunction with the trained algorithms 164A-$n$, identify and annotate one or more parking spots in the BEVi 166. A series of BEVi's 166A-$n$ can be generated in response to a series of images 155A-$n$ being continually captured (e.g., during operation of vehicle 102).
6) The PSDC 170 can forward respective parking spot information as information 198 (e.g., images, parking spot dimensions, etc.) to an onboard navigation component 142, which can utilize the information to park vehicle 102 in an identified available spot.
7) The PSDC 170 can further forward respective parking spot information 198 to other vehicles 195A-$n$ and/or a remotely located computer system 199.

Figure 2:
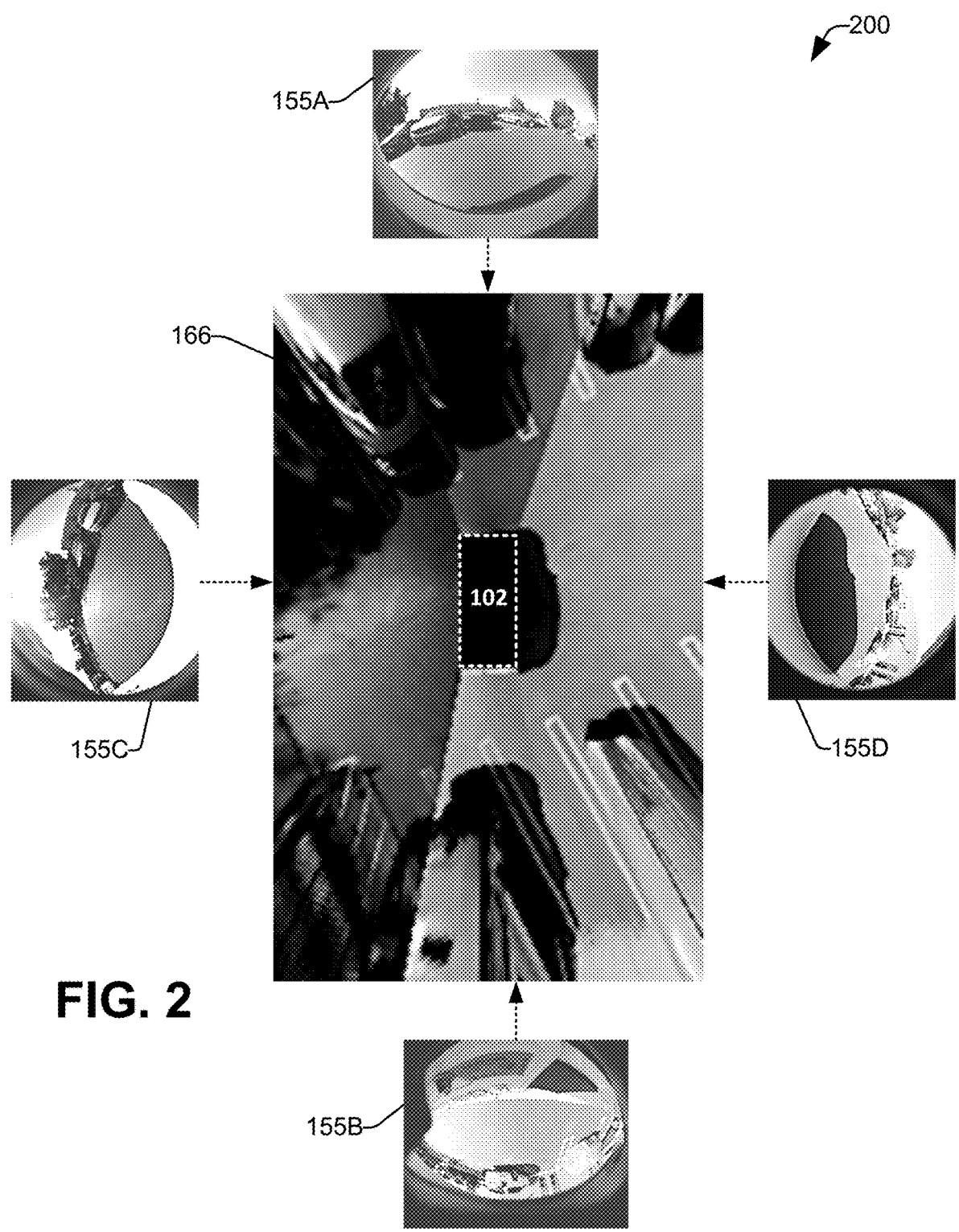
FIG. 2 is a schematic illustrating a group of digital images being stitched together to form a composite image (e.g., a birds eye view image), according to an embodiment.

As mentioned, during navigation/motion of vehicle 102, the various sensors/cameras 150A-$n$ and algorithms 164A-$n$ can be utilized to generate images and information regarding the operational environment of vehicle 102. FIG. 2, schematic 200, presents a group of images 155A-D being stitched together to form a BEVi 166. As shown image 155A (captured by camera 150A), image 155B (captured by camera 150B), image 155C (captured by camera 150C), and image 155D (captured by camera 150D) are being stitched together/combined (e.g., by image component 163) to form the BEVi 166. The relative location of vehicle 102 in the BEVi 166 is also indicated.

Figure 3A:
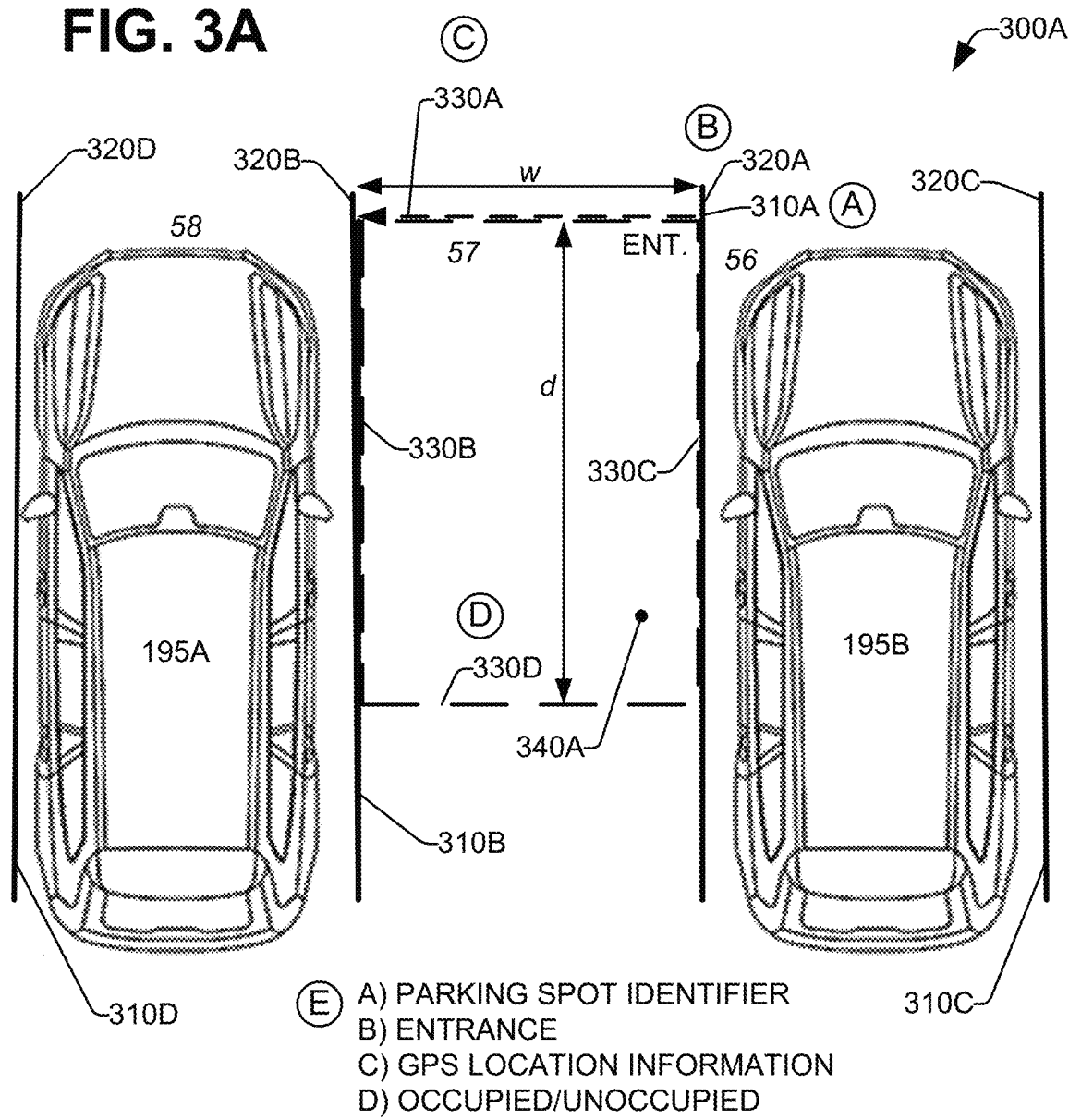
FIG. 3A is a schematic presenting respective operations to identify and annotate a parking spot, in accordance with various embodiments presented herein.
Figure 3B:
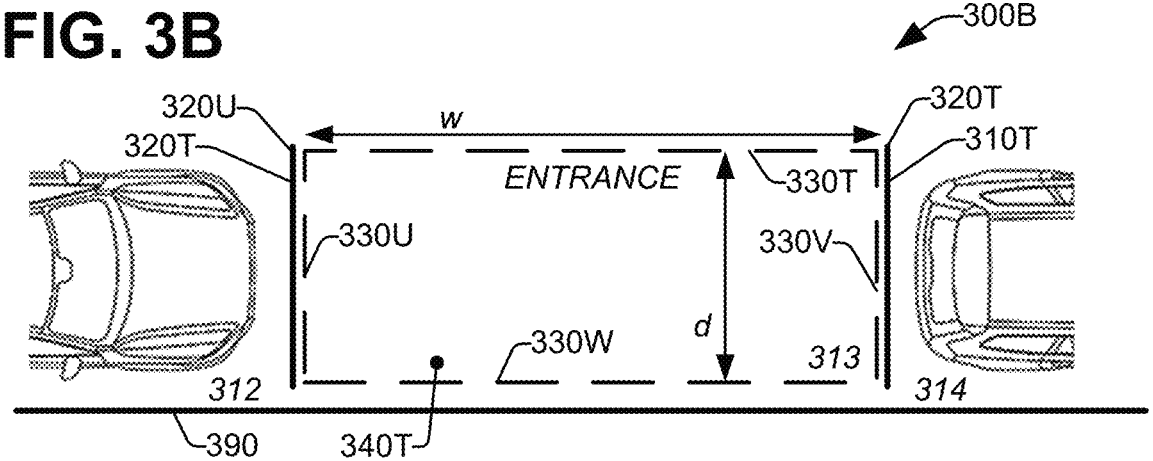
FIG. 3B is a schematic presenting respective identifiers and markings of a parallel parking spot, in accordance with various embodiments presented herein.

FIGS. 3A and 3B, schematics 300A and 300B present respective operations to identify and annotate a parking spot, in accordance with various embodiments presented herein. FIGS. 3A-B can be read in conjunction with FIGS. 4A-C and FIGS. 5A-C, wherein FIGS. 4A-C and FIGS. 5A-C present schematics for identification and annotation of parking spots in a composite image, in accordance with an embodiment. In particular, FIGS. 4A-C and 5A-C present identification and annotation of parking spots in the BEVi 166.

As mentioned regarding FIG. 1, step (5), the PSDC 170 can, in conjunction with the trained algorithms 164A-$n$, identify and annotate one or more parking spots in the BEVi 166. The identification process performed by PSDC 170 can, in conjunction with the trained imaging algorithms 164A-$n$, entail:

A) identifying respective markings/lines 310A-$n$ in BEVi 166A that define respective parking spots/spaces, e.g., in a parking lot 151, along a parking lane on a street 152. In an embodiment, spot markings/lines 310A can indicate roadside kerb/curb structures (e.g., when the parking spot is on a street), and can be any of, in a non-limiting list, white and/or yellow painted stripes, a continuous line or a broken/dashed pattern, a single line, a double line, formed with white stones, reflective beads, reflective studs colloquially termed "cat's eyes", and such like.

B) identifying the respective ends of the markings 310A-$n$ in BEVi 166A, e.g., end 320A of marking 310A, end 320B of marking 310B, end 320B of marking 310B, end 320B of marking 310B. In an example scenario of operation, vehicle 102 may be navigating a parking lot 151, where, owing to the various parked vehicles (e.g., vehicles 195A and 195B), it may not be possible for the onboard cameras 150A-$n$ to fully determine markings 310A-$n$, but it is possible/typical for the marking ends 320A-$n$ to be visible, and further, a respective direction of markings 310A-$n$ to be inferred.

C) a line 330A can be drawn in BEVi 166A between a pair of ends that define a parking spot, e.g., line 330A is drawn between ends 320A and 320B, wherein length of line 330A can define a width w of the parking spot (e.g., parking spot 57, wherein parking spot 57 is located between parking spots 56 and 58).

D) with the line 330A drawn and identifying the parking space (e.g., parking space 57), an algorithm 164A can be further configured to draw a shape 340A that extends into the parking space represented on the BEVi 166A. In an embodiment, the shape can be a two-dimensional shape. In the example shown, the shape 340A can be a rectangle having a first side 330A, a left side 330B, a right side 330B, and a fourth side 330D, wherein fourth side 330D is opposite to first side 330A. The distance d between the first side 330A and the fourth side 330D can be preset in the algorithm 164A, wherein, for example, for a perpendicular parking spot, distance d can be set at a distance equal or greater than the width w of the rectangle (e.g., as defined by length of line 330A), while for a parallel parking spot, distance d can be set at a distance less than width w. In an embodiment, to address issues arising from distortion in BEVi 166, e.g., arising from the lens physics of cameras 150A-$n$ and/or perspective issues in images 155A-$n$, the width w of each line 330A identifying an entrance to a parking spot, by creating a rectangle of a fixed depth d, the parking spots can be identified having different respective entrance widths, the parking spots can have the same depths. In an embodiment, by consistently drawing the line 330A in a particular direction, the parking lot shape can be consistently extended into the BEVi 166A as required to correctly define the parking spot, as further described with reference to FIG. 9.

E) as previously mentioned, various data/information (e.g., as metadata) can be defined for the parking spot, e.g., shape 340A can be annotated with a parking spot identifier (e.g., parking spot 57), line 330A can be defined as the entrance (ENT) to the parking spot, GPS location of the parking spot, and further whether the parking spot is occupied (e.g., per parking spots 56 and 58 respectively occupied with vehicles 195A and 195B). The shape 340A can be further annotated with information 198 received from external system 199, other vehicles 195A-$n$.

In an embodiment, the sequence of construction of the shape 340A can be conducted in a clockwise or counter-clockwise manner (e.g., as further described with reference to FIG. 9), e.g., line 330A is drawn first starting at end 320A to end 320B, side 330B is next drawn with a length equal to distance d, line 330D is drawn next from marker 310B to marker 310A, and finally line 330C is drawn to close the rectangle at end 320A.

Referring to FIG. 3B, while FIG. 3A illustrates parking spaces having a perpendicular (bay parking) arrangement, which can also be utilized for angled parking/echelon parking spot arrangements, FIG. 3B, schematic 300B, illustrates a streetside-based parking spot that can require a parallel parking maneuver to park a vehicle in such a parking spot. In FIG. 3B, a first spot marking/line 310T and a second spot marking/line 310U extend from a kerb 390 into a road. Per the various embodiments presented herein, a first end 320T of the first marker 310T and a second end 320U of the second marker 310U can be identified, with line 330T drawn therebetween. Subsequently, a shape 340T can be drawn that extends into the parking space. In an embodiment, the shape can be a two-dimensional shape. In the example shown, the shape 340T can be a rectangle having a first side 330T, a left side 330U, a right side 330V, and a fourth side 330W, wherein fourth side 330W is opposite to first side 330T. The distance d between the first side 330T and the fourth side 330W can be preset in the algorithm 164A. Accordingly, line 330T can be annotated as the entrance to the parking spot 313 located between parking spots 312 and 314.

Regarding width w and distance d, while width w can be ascertained based upon the distance between the ends of the spot markers (e.g., 320A, 320B, 320C, 320T, 320U), as mentioned d can be preset/predefined (e.g., in the PSDC 170, algorithms 164A-n. Various regulations/guidelines around the globe can be considered when predefining d. For example, in the US, the depth of a parking spot (e.g., FIG. 3A, a perpendicular, bay, or angled spot) recommended by the U.S. Dept. of Transportation is about 19 feet (5.8m), while a parallel parking space (e.g., FIG. 3B) may be 20-24 ft (6.1-7.3 m) wide, with a depth d of 8.5 to 9.0 ft (2.6-2.7 m). In France, the recommendation for a depth d in parallel parking configuration (e.g., FIG. 3B) is 2.2-2.3 metres (7.2-7.5 ft). In the UK, parking spots of 2.4 metres (7.9 ft) by 4.8 metres (16 ft) are recommended. While in Australia, parking spots of 2.4 metres by 5.4 metres are recommended.

Figure 4A:
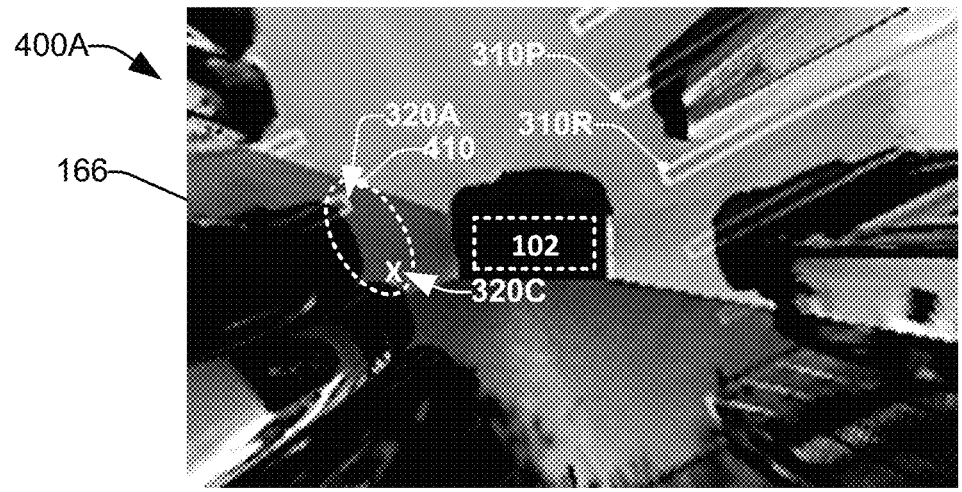
FIGS. 4A-C present images in a schematic for identification of a parking spot, wherein the parking spot is occupied, in accordance with an embodiment.
Figure 4B:
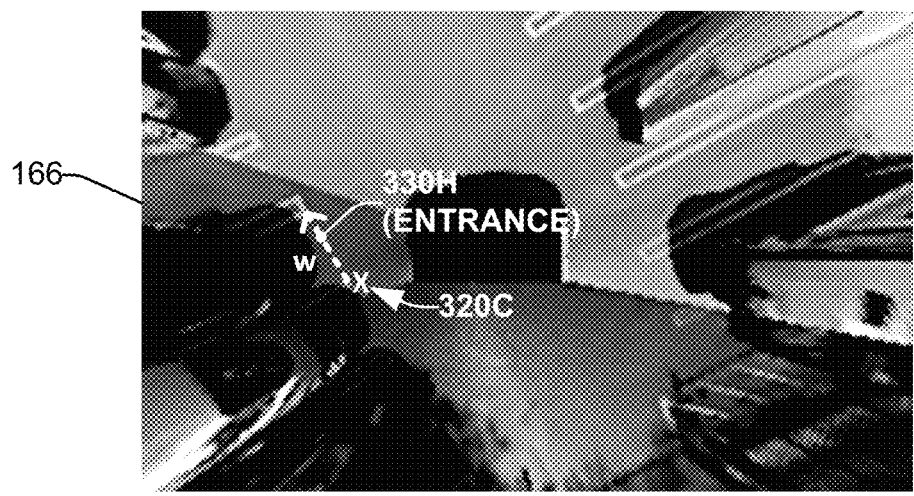
Figure 4C:
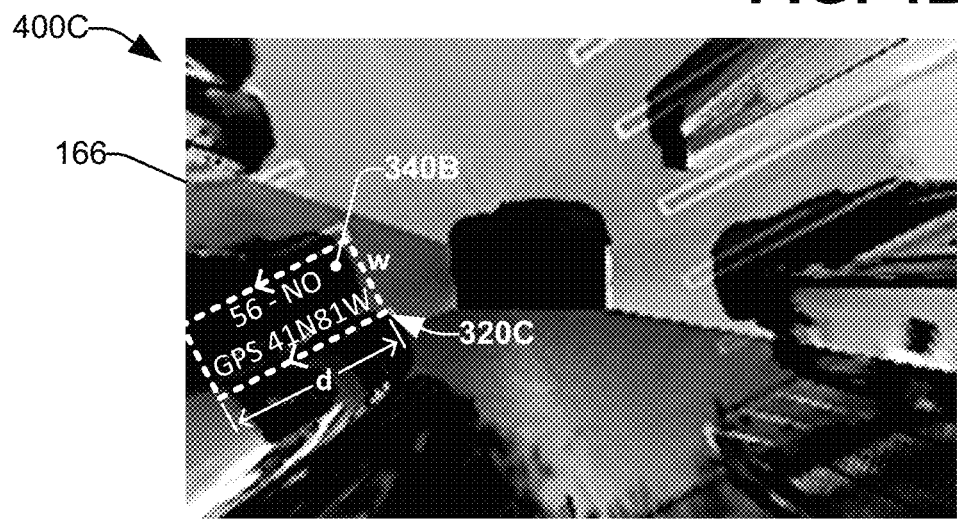

FIGS. 4A-C, images 400A-C, present a schematic for identification of a parking spot, wherein the parking spot is occupied, in accordance with an embodiment. Per FIG. 4A, a potential parking spot entrance 410 is identified. On BEVi 166, a first end 320C of a first parking spot marker is identified, and a second end 320A of a second parking spot marker is identified. Per FIG. 4B, a line 330H is drawn on BEVi 166 connecting first end 320C with second end 320A. As noted on FIG. 4B, the line 330H identifies the entrance of the parking spot. As shown in FIG. 4C, a shape 340B is generated by extending sides with a distance d to define the parking space. Further, as mentioned, the shape 340B can be annotated with a parking space identifier (e.g., 56), GPS location information (e.g., 41N81W), whether the parking spot was vacant or a vehicle was parked there (e.g., NO the parking spot is not vacant, it is currently occupied, annotated in red, for example).

Figure 5A:
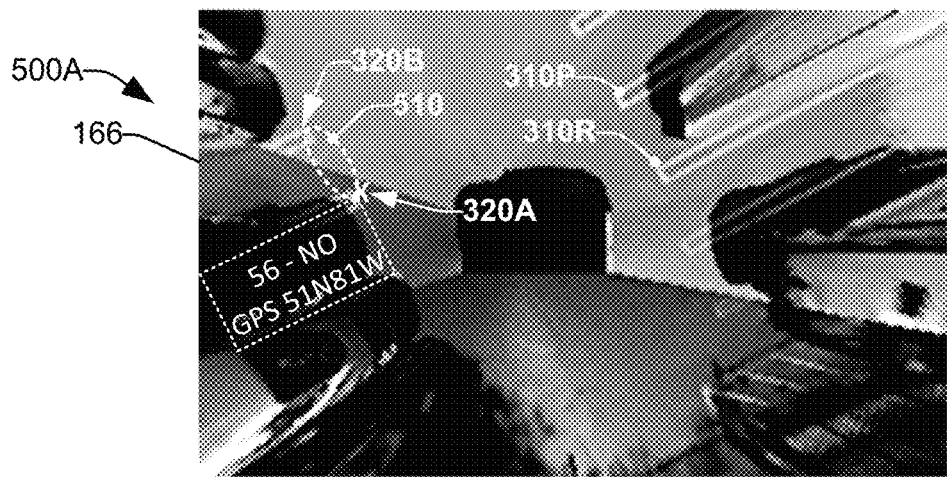
FIGS. 5A-C present images in a schematic for identification of a parking spot, wherein the parking spot is not occupied, in accordance with an embodiment.
Figure 5B:
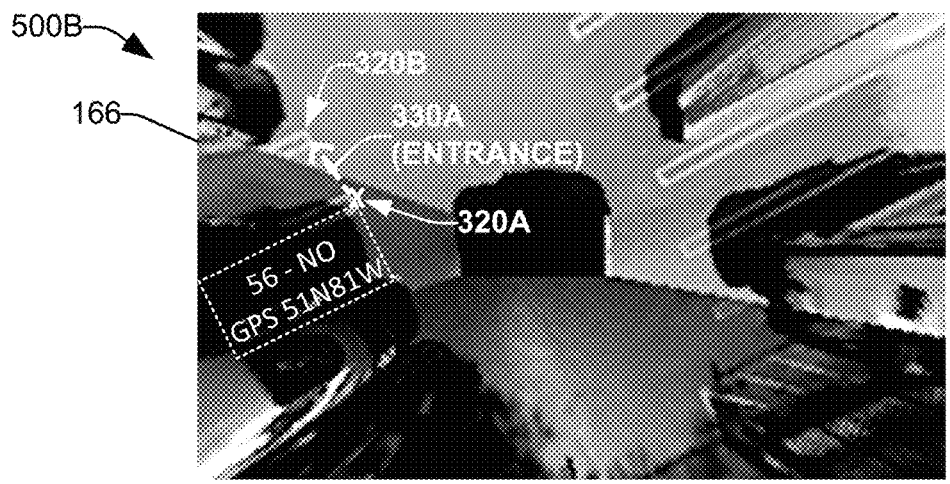
Figure 5C:
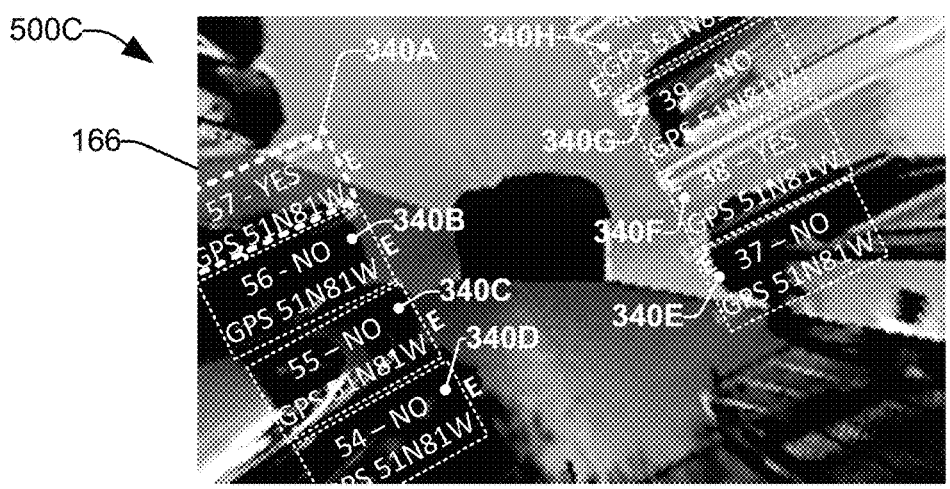

FIGS. 5A-C, images 500A-C, present a schematic for identification of a parking spot, wherein the parking spot is not occupied, in accordance with an embodiment. FIGS. 5A-C are comparable to the empty parking spot depicted in FIG. 3. Per FIG. 5A, a potential parking spot entrance 510 is identified. On BEVi 166, a first end 320A of a first parking spot marker is identified, and a second end 320B of a second parking spot marker is identified. Per FIG. 5B, a line 330A is drawn on BEVi 166 connecting first end 320A with second end 320B. As noted on FIG. 5B, the line 330A identifies the entrance of the parking spot. As shown in FIG. 5C, a shape 340A is generated by extending sides with a distance d to define the parking space. Further, as mentioned, the shape 340A can be annotated with a parking space identifier (e.g., 57), GPS location information (e.g., 41N81W), whether the parking spot was vacant or a vehicle was parked there (e.g., YES the parking spot is currently vacant, it is currently not occupied, annotated in green, for example). As further shown in FIG. 5C, other parking spots 37 (shape 340E), 38 (shape 340F), 39 (shape 340G), 40 (shape 340H), 54 (shape 340D), 55 (shape 340C), and 56 (shape 340D) have been previously identified and annotated.

Figure 6:
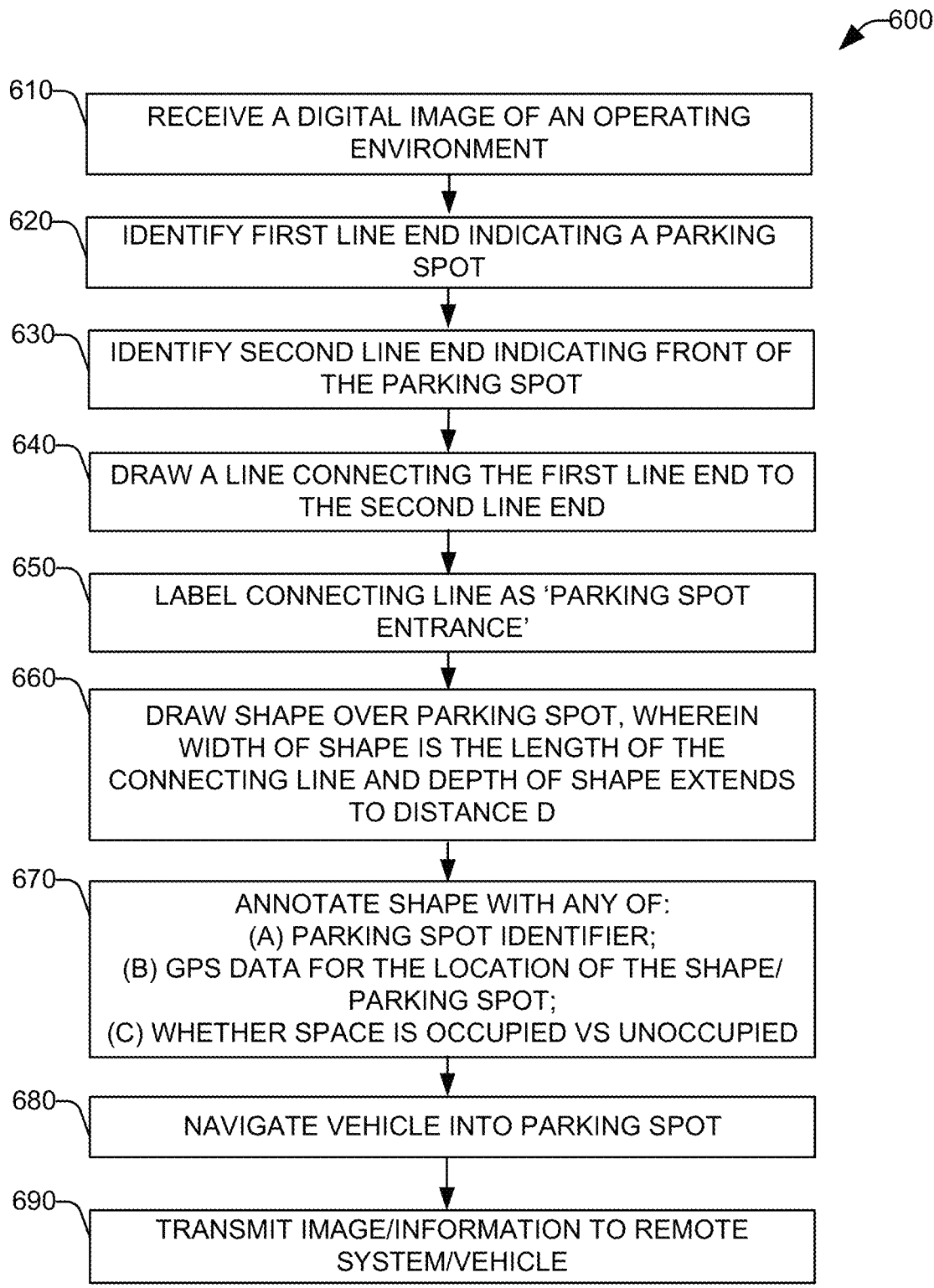
FIG. 6 illustrates a flow diagram for a computer-implemented methodology to identify and annotate a parking spot by an imaging system located onboard a vehicle, in accordance with at least one embodiment.

FIG. 6 illustrates a flow diagram 600 for a computer-implemented methodology to identify and annotate a parking spot by an imaging system located onboard a vehicle, in accordance with at least one embodiment.

At 610, a composite digital image (e.g., BEVi 166) can be generated by an imaging system (e.g., image component 163) onboard a vehicle (e.g., vehicle 102), wherein the digital image can be generated based on stitching together a set of digital images (e.g., images 155A-n). The digital images can be generated by one or more cameras (e.g., wide-angle cameras 150A-n) onboard the vehicle. The composite digital image can be received at a parking spot component (e.g., PSDC 170) onboard the vehicle, wherein the parking spot component can be configured to identify and annotate respective parking spots in the composite digital image. The parking spot component can include a neural network and algorithms (e.g., algorithms 164A-n).

At 620, a first end (e.g., first end 320A) of a first parking spot marker (e.g., spot marker 310A) is identified on the composite digital image.

At 630, a second end (e.g., second end 320B) of a second parking spot marker (e.g., spot marker 310B) is identified on the composite digital image.

At 640, a line (e.g., line 330A) can be drawn on the composite digital image, connecting the first end of the first parking spot marker with the second end of the second parking spot marker.

At 650, the connecting line can be annotated/labelled as the entrance to the parking spot.

At 660, a shape (e.g., shape 340A) can be generated and drawn over the parking spot, wherein the width w of the shape is the length of the connecting line and the depth d of the shape can be based on any arbitrary value that causes the shape to be drawn over the parking spot.

At 670, the shape can be annotated with data/information comprising any of (a) a parking spot identifier (e.g., spots 56, 57, 58, etc. of FIGS. 3-5D), (b) GPS location data of the parking spot (e.g., as provided by GPS system 185 to the PSDC 170), (c) whether the parking spot is occupied or is available (e.g., per FIG. 5C, parking spot 57 is open while parking spot 58 is not), or (d) information (e.g., information 198) received from an external system (e.g., external system 199). The annotated data/information can be attached to the composite digital image by any suitable technology, e.g., metadata.

At 680, the composite digital image and annotated data/information can be provided (e.g., as information 198) to an onboard navigation component (e.g., transmitted from PSDC 170 to navigation component 142), wherein the navigation component can subsequently use the composite digital image and/or annotated data/information to park the vehicle (e.g., vehicle 102) in an available parking spot in the composite digital image.

At 690, the composite digital image and annotated data/information can be provided (e.g., as information 198 via I/O 116, antenna 117, signals 190A-*n*) to one or more vehicles (e.g., vehicles 195A-*n*) that may be in the area and are configured to receive updates/information regarding parking spot location/availability. The annotated data/information can also be provided to an external computer-based system (e.g., external system 199) configured to compile parking spot information, and further analyze/distribute the parking spot information, e.g., to other drivers/vehicles, data analysts, etc.

In an embodiment, steps 610 to 670 can be performed by the external system (e.g., external system 199) based on digital images (e.g., images 155A-*n* or BEVi 166) generated by an onboard imaging system (e.g., cameras 150A-*n* and image component 163 located onboard vehicle 102). Hence, the vehicle and onboard imaging systems can be assigned to providing the digital images, while the external system can perform the potentially computationally heavy task of identifying and annotating the parking spots in the composite digital images.

Figure 7:
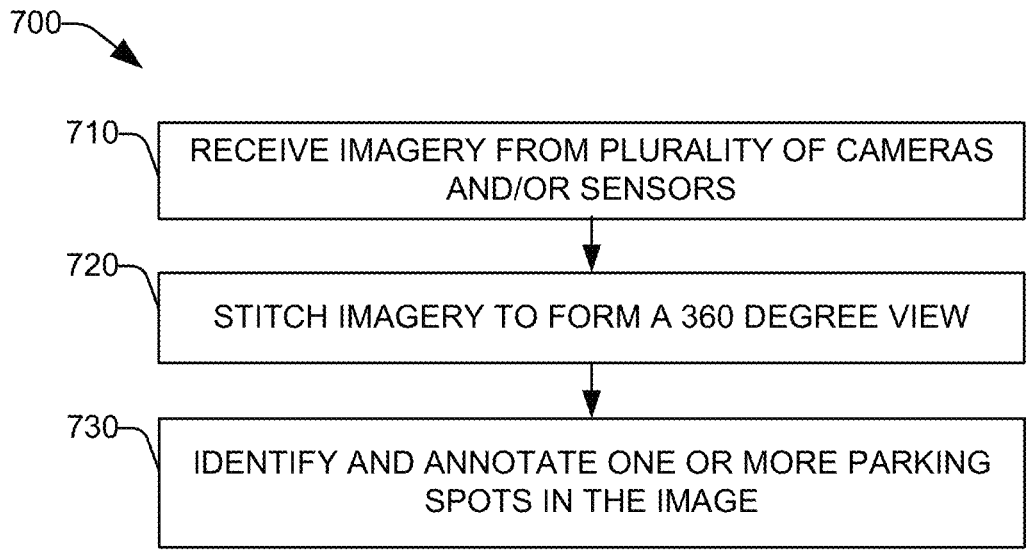
FIG. 7 illustrates a flow diagram for a computer-implemented methodology providing a summary of identification and annotation of a parking spot by an imaging system located onboard a vehicle, in accordance with at least one embodiment.

FIG. 7 illustrates a flow diagram 700 for a computer-implemented methodology providing a summary of identification and annotation of a parking spot by an imaging system located onboard a vehicle, in accordance with at least one embodiment.

At 710, various digital images (e.g., images 155A-*n*) can be generated by cameras and sensors (e.g., cameras/sensors 150A-*n*) located onboard a vehicle (e.g., vehicle 102). The digital images can be transmitted to, and received by, an imaging component (e.g., image component 163).

At 720, the imaging component can stitch related digital images (e.g., having comparable timestamps of creation) together to form a composite image (e.g., BEVi 166).

At 730, the composite image can be transmitted from the imaging component to a parking spot component (e.g., a PSDC 170) configured to identify and annotate parking spots (e.g., parking spots 54-57 and 47-40) in the composite image.

Figure 8:
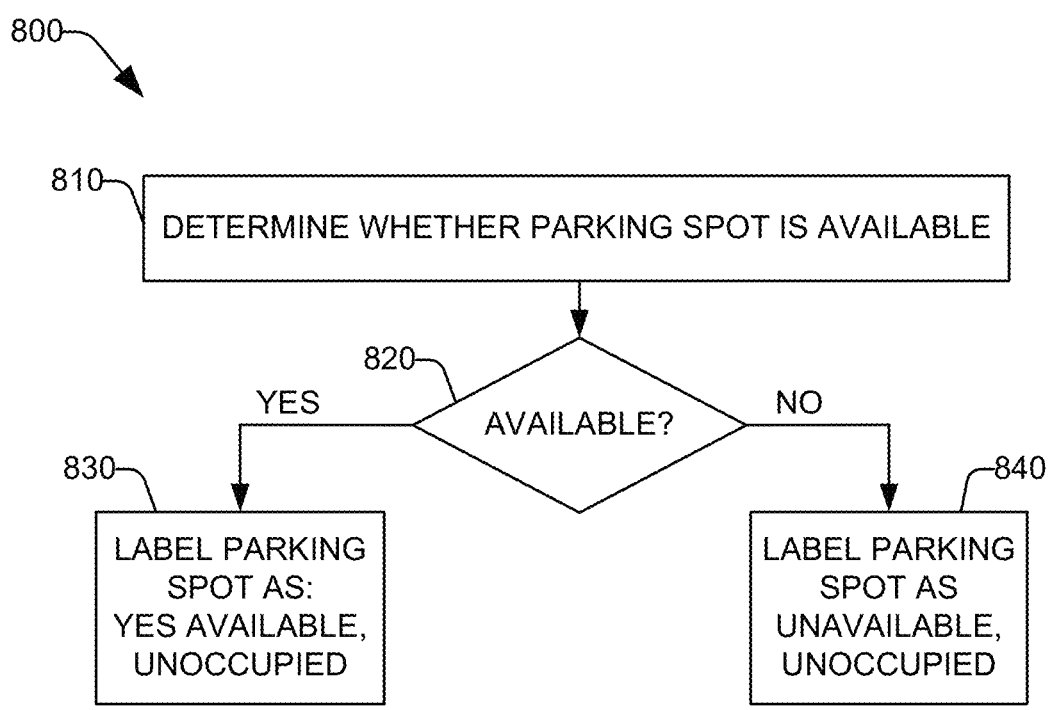
FIG. 8 illustrates a flow diagram for a computer-implemented methodology to determine whether a parking spot captured in a digital image is available or unavailable, in accordance with at least one embodiment.

FIG. 8 illustrates a flow diagram 800 for a computer-implemented methodology to determine whether a parking spot captured in a digital image is available or unavailable, in accordance with at least one embodiment.

At 810, as previously described, a parking spot can be identified (e.g., by PSDC 170) within a digital image (e.g., BEVi 166), and a determination made regarding whether another vehicle currently occupies the parking spot or the parking spot is available.

At 820, a determination (e.g., by PSDC 170) can be made regarding whether the digital image indicates a vehicle is currently occupying the parking spot, or not. In response to a determination that YES, the digital image depicts the parking spot is available, no vehicle occupies the parking spot, methodology 800 can advance to 830. At 830, the parking spot in the image can be annotated as being available.

Returning to 820, in response to a determination that NO, the digital image depicts the parking spot is unavailable, a vehicle occupies the parking spot, methodology 800 can advance to 840. At 840, the parking spot in the image can be annotated as being unavailable.

Figure 9:
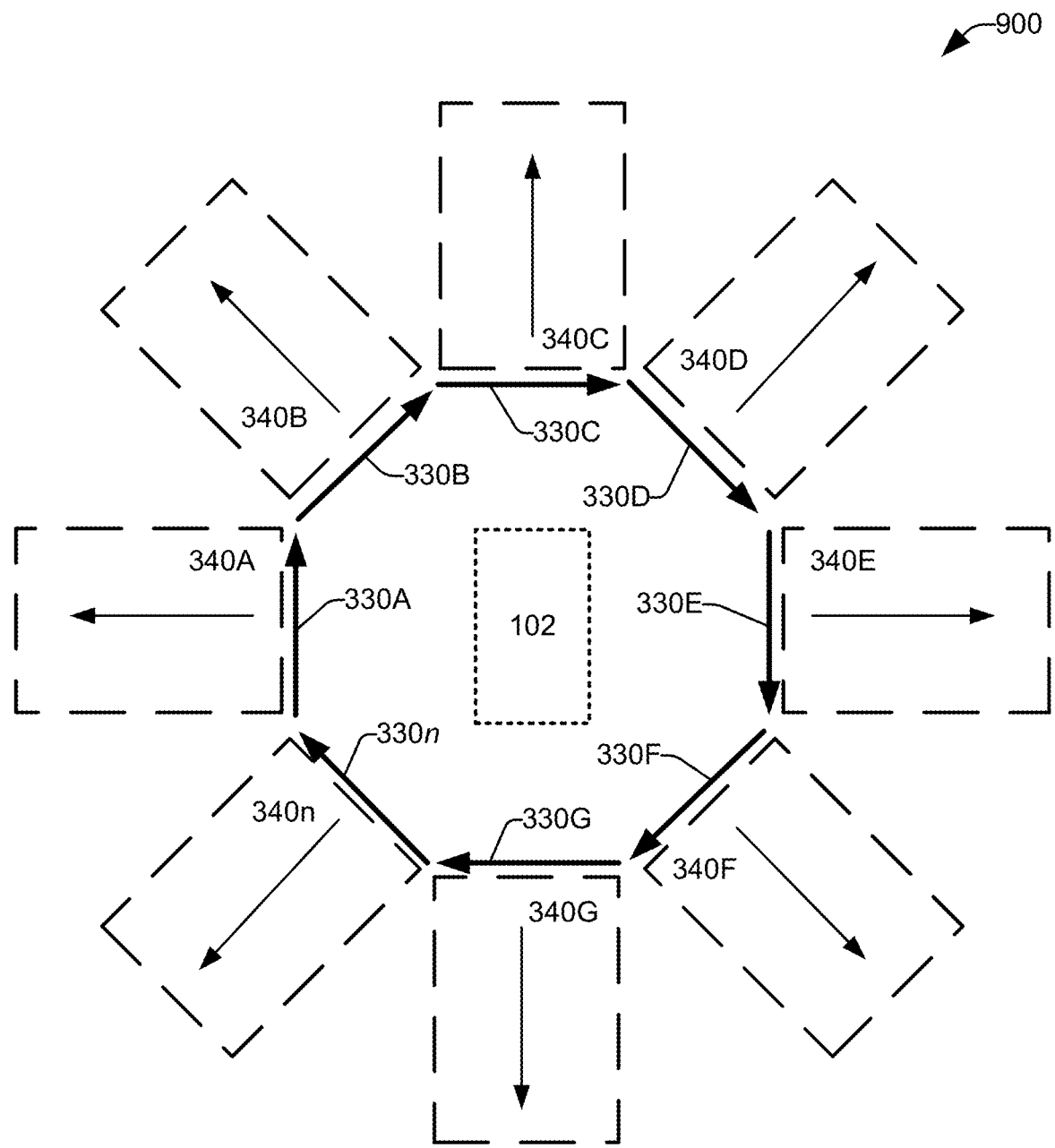
FIG. 9 presents a schematic illustrating the respective parking spot shapes and their alignment being defined relative to a vehicle, in accordance with an embodiment.

Turning to FIG. 9, schematic 900, presents the respective parking spot shapes and their alignment being defined relative to a vehicle, in accordance with an embodiment. As previously mentioned, as part of the parking spot identification and determination, lines 330A-*n* can be respectively drawn between marker end points 320A-*n*, and the shapes 340A-*n* are respectively drawn in a direction extending away from the vehicle 102. In the examples presented in FIG. 9, lines 330A-*n* are respectively drawn in a clockwise direction. In an alternative embodiment, lines 330A-*n* can be drawn in a counter-clockwise direction, with the shapes 340A-*n* extending away from vehicle 102.

Example Applications and Use

Figure 10:
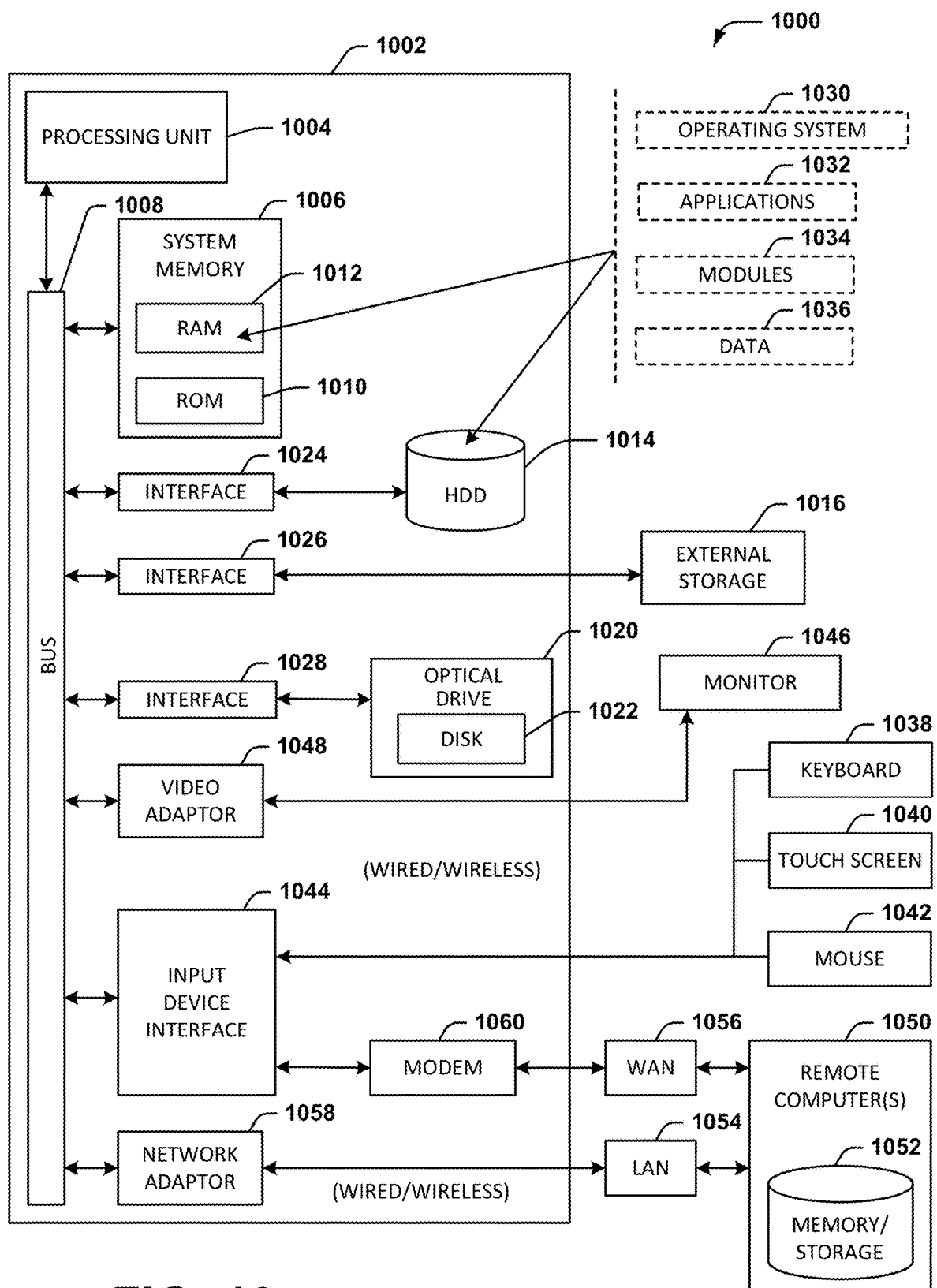
FIG. 10 is a block diagram illustrating an example computing environment in which the various embodiments described herein can be implemented.
Figure 11:
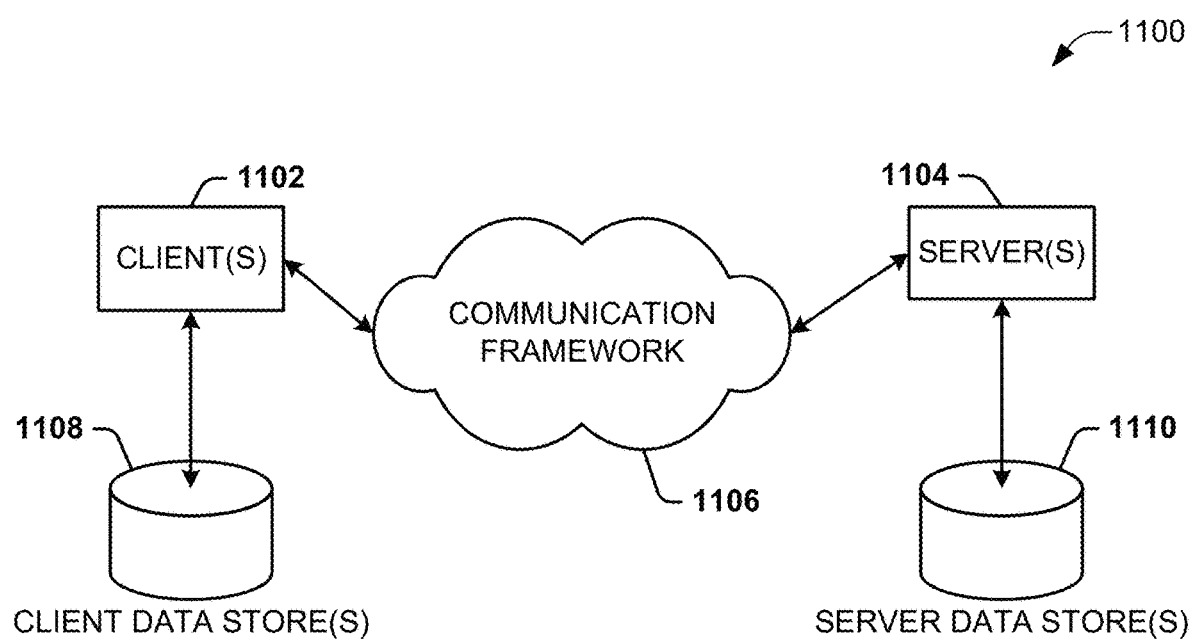
FIG. 11 is a block diagram illustrating an example computing environment with which the disclosed subject matter can interact, in accordance with an embodiment.

Turning next to FIGS. 10 and 11, a detailed description is provided of additional context for the one or more embodiments described herein with FIGS. 1-9.

In order to provide additional context for various embodiments described herein, FIG. 10 and the following discussion are intended to provide a brief, general description of a suitable computing environment 1000 in which the various embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors and may include a cache memory. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the.NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, stand-alone, executable packages of software that include, e.g., code, runtime, system tools, system libraries and settings for an application.

Further, computer 1002 can comprise a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1094 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

Referring now to details of one or more elements illustrated at FIG. 11, an illustrative cloud computing environment 1100 is depicted. FIG. 11 is a schematic block diagram of a computing environment 1100 with which the disclosed subject matter can interact. The system 1100 comprises one or more remote component(s) 1110. The remote component(s) 1110 can be hardware and/or software (e.g., threads, processes, computing devices). In some embodiments, remote component(s) 1110 can be a distributed computer system, connected to a local automatic scaling component and/or programs that use the resources of a distributed computer system, via communication framework 1140. Communication framework 1140 can comprise wired network devices, wireless network devices, mobile devices, wearable devices, radio access network devices, gateway devices, femtocell devices, servers, etc.

The system 1100 also comprises one or more local component(s) 1120. The local component(s) 1120 can be hardware and/or software (e.g., threads, processes, computing devices). In some embodiments, local component(s) 1120 can comprise an automatic scaling component and/or programs that communicate/use the remote resources 1110 and 1120, etc., connected to a remotely located distributed computing system via communication framework 1140.

One possible communication between a remote component(s) 1110 and a local component(s) 1120 can be in the form of a data packet adapted to be transmitted between two or more computer processes. Another possible communication between a remote component(s) 1110 and a local component(s) 1120 can be in the form of circuit-switched data adapted to be transmitted between two or more computer processes in radio time slots. The system 1100 comprises a communication framework 1140 that can be employed to facilitate communications between the remote component(s) 1110 and the local component(s) 1120, and can comprise an air interface, e.g., Uu interface of a UMTS network, via a long-term evolution (LTE) network, etc. Remote component(s) 1110 can be operably connected to one or more remote data store(s) 1150, such as a hard drive, solid state drive, SIM card, device memory, etc., that can be employed to store information on the remote component(s) 1110 side of communication framework 1140. Similarly, local component(s) 1120 can be operably connected to one or more local data store(s) 1130, that can be employed to store information on the local component(s) 1120 side of communication framework 1140.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive-in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "client entity," "consumer," "client entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

While not an exhaustive listing, summarizing various embodiments, but not all embodiments, presented herein:
1. A system, located on a vehicle, comprising: a memory that stores computer executable components; and a processor that executes the computer executable components stored in the memory, wherein the computer executable components comprise: a parking spot detection component configured to: identify a parking spot, wherein the parking spot is identified based on at least one digital image captured by at least one sensor located onboard the vehicle.
2. The system of claim 1, wherein the vehicle is operating in one of a partially autonomous manner, a fully autonomous manner, or is being operated by a human driver.
3. The system of claim 1, wherein the at least one sensor comprises at least one camera configured to capture digital imagery of an environment in which the vehicle is operating, and the imagery comprises a 360 degree field of view around the vehicle.
4. The system of any preceding claim, wherein the at least one camera comprises a fish-eye lens camera.
5. The system of any preceding claim, further comprising: an image component configured to: receive the digital imagery captured by the at least one camera, wherein the at least one camera comprises a group of cameras; and stitch digital images respectively received from each camera in the group of cameras, wherein the digital images are stitched to form the 360 degree field of view around the vehicle.
6. The system of any preceding claim, wherein the image component is further configured to: transmit the stitched digital image to the parking spot detection component; wherein the parking spot detection component is further configured to: receive the stitched digital images; identify a parking spot within the stitched digital images; and annotate the parking spot.
7. The system of any preceding claim, wherein the parking spot detection component is further configured to annotate the parking spot by: identifying a first marker indicating a first side of the parking sport; identifying a second marker indicating a second side of the parking spot; drawing a first line in the digital imagery to digitally connect the first marker to the second marker, wherein the first line indicates a first side of the parking spot; and drawing a rectangle over the parking spot, wherein the rectangle comprises four sides, wherein the first line is a first side of the rectangle indicating an entrance of the parking spot, the first marker is a second side of the rectangle, the second marker is a third side of the rectangle, wherein the second side of the rectangle and third side of the rectangle are on opposite sides of the rectangle, and fourth side of the rectangle indicates a rear portion of the parking lot, wherein the width of the rectangle is defined by the length of the first line, and the depth of the rectangle is at least the width of the rectangle.
8. The system of any preceding claim, wherein the parking spot detection component comprises a neural network configured to: identify the first marker and the second marker; draw the rectangle over the parking spot; and annotate the rectangle with at least one of: an entrance point defined at the first side of the rectangle; a width of the rectangle based on the length of the first side; a depth of the rectangle based on at least the width of the rectangle; or a location of the parking spot, wherein the location of the parking spot is based on GPS data received at the image component.
9. The system of any preceding claim, wherein the parking spot detection component is further configured to determine a presence of a vehicle in the parking spot, wherein: in response to a determination of no vehicle being detected in the parking spot, the image component is further configured to indicate on the rectangle that the parking spot is available; and in response to a determination of a vehicle is currently in the parking spot, the image component is further configured to indicate on the rectangle that the parking spot is not available.
10. The system of any preceding claim, wherein the parking spot detection component is further configured to transmit the annotated rectangle to a communication component, wherein the communication component is further configured to transmit the annotated rectangle to a remotely located computer system, wherein the remotely located computer system is one of a computing system onboard a second vehicle or a central computer system configured to compile parking spot information for a particular region.

11. The system of any preceding claim, wherein the parking spot detection component is configured to identify the first marker and the second marker and draw the rectangle over the parking spot based on training data comprising digital images having respective parking spots identified thereon.

12. A method, by a device comprising a processor, comprising: detecting, on a digital image, a first end point of a first parking space marker; detecting, on the digital image, a second end point of a second parking space marker; drawing a line, on the digital image, connecting the first end point to the second end point; and drawing a 2-dimensional shape, on the digital image, wherein the line forms a side of the shape, and the width of the shape is the length of the connecting line.

13. The method of claim 12, further comprising extending drawing of the shape into the parking space defined by the first parking space marker and the second parking space marker, wherein the 2-dimensional shape is a rectangle and the length of the rectangle is set to a predefined distance.

14. The method of any preceding claim, further comprising annotating the digital image with at least one of: an identifier for the parking space; a label indicating the line between the first end point and the second end point is an entrance to the parking space; global positioning system data identifying the location of the parking space; or an indicator identifying whether the parking space is available or is unavailable.

15. The method of claim 12, wherein the device is: located on a vehicle; or remotely located from a vehicle with an onboard system configured to generate the digital image.

16. The method of any preceding claim, wherein the digital image is a birds eye view image formed by digitally stitching a set of images together, wherein the set of images are digital images generated by cameras located on the vehicle.

17. A computer program product comprising a computer readable storage medium having program instructions embodied therewith, the program instructions executable by a processor to cause the processor to: detect, on a digital image, a first end point of a first parking space marker; detect, on the digital image, a second end point of a second parking space marker; draw a line, on the digital image, connecting the first end point to the second end point; and draw a rectangle on the digital image, wherein the line forms a side of the shape, the width of the shape is the length of the connecting line, and the rectangle extends by a predefined distance into the parking space defined by the first parking space marker and the second parking space marker.

18. The computer program product of claim 17, wherein the program instructions are further executable by the processor to cause the processor to annotate the digital image with at least one of: an identifier for the parking space; a label indicating the line between the first end point and the second end point is an entrance to the parking space; global positioning system data identifying the location of the parking space; or an indicator identifying whether the parking space is available or is unavailable.

19. The computer program product of claim 17, wherein the processor is located on a vehicle.

20. The computer program product of any preceding claim, wherein the digital image is a birds eye view image formed by digitally stitching a set of images together, wherein the set of images are digital images generated by cameras located on the vehicle.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, located on a vehicle, comprising:
   a memory that stores computer executable components; and
   a processor that executes at least one of the computer executable components that:
      identifies, using a neural network, a parking spot based on a digital image generated from image data captured by at least one sensor located onboard the vehicle, wherein the identifying comprises annotating the digital image by:
         identifying, in the digital image, a first marker indicating a first side of the parking spot;
         identifying, in the digital image, a second marker indicating a second side of the parking spot;
         drawing a first line in the digital image that connects the first marker to the second marker, wherein the first line indicates an entrance to the parking spot; and
      drawing a rectangle over the parking spot, wherein the rectangle comprises four lines representing four sides of the rectangle, wherein the first line is a first side of the rectangle, a second line of the rectangle corresponding to the first marker is a second side of the rectangle, a third line of the rectangle corresponding to the second marker is a third side of the rectangle, wherein the second side of the rectangle and third side of the rectangle are on opposite sides of the rectangle, and a fourth line of the rectangle corresponding to a fourth side of the rectangle indicates a rear portion of the parking spot, wherein a width of the rectangle is defined by a length of the first line, and a depth of the rectangle is at least the width of the rectangle; and
      annotating the rectangle with at least one of:
         an entrance point defined at the first side of the rectangle;
         the width of the rectangle;
         the depth of the rectangle; or
         a location of the parking spot, wherein the location of the parking spot is based on GPS data.

2. The system of claim 1, wherein the vehicle is operating in one of a partially autonomous manner, a fully autonomous manner, or is being operated by a human driver.

3. The system of claim 1, wherein the at least one sensor comprises cameras configured to capture respective portions of the image data of an environment in which the vehicle is operating, and wherein the at least one of the computer executable components further generates the digital image by stitching together the respective portions of the image data into a 360 degree field of view around the vehicle.

4. The system of claim 1, wherein the at least one sensor comprises a fish-eye lens camera, and wherein the digital image comprises a fish-eye image.

5. The system of claim 1, wherein identifying the parking spot further comprises:
   determining whether the parking spot is occupied, wherein the determining comprises:
      in response to a first determination that the parking spot is not occupied, adding a first indication on the rectangle that the parking spot is available; and
      in response to a second determination that the parking spot is occupied, adding a second indication on the rectangle that the parking spot is not available.

6. The system of claim 1, wherein the at least one of the computer executable components further:
   transmits the annotated rectangle to a remotely located computer system, wherein the remotely located computer system is one of a computing system onboard a second vehicle or a central computer system configured to compile parking spot information for a particular region.

7. The system of claim 1, wherein the neural network is trained to identify the first marker and the second marker and draw the rectangle over the parking spot based on training data comprising a set of training digital images having parking spots identified thereon.

8. The system of claim 1, wherein identifying the parking spot-further comprises:
   determining the depth of the rectangle based on a predefined regulation associated with a geographic region comprising the location of the parking spot.

9. A method, comprising:
   identifying, by a system of a vehicle, using a neural network, a parking spot based on a digital image generated from image data captured by at least one sensor located onboard the vehicle, wherein the identifying comprises annotating the digital image by:
      identifying, in the digital image, a first marker indicating a first side of the parking spot;
      identifying, in the digital image, a second marker indicating a second side of the parking spot;
      drawing a first line in the digital image that connects the first marker to the second marker, wherein the first line indicates an entrance to the parking spot; and
      drawing a rectangle over the parking spot, wherein the rectangle comprises four lines representing four sides of the rectangle, wherein the first line is a first side of the rectangle, a second line of the rectangle corresponding to the first marker is a second side of the rectangle, a third line of the rectangle corresponding to the second marker is a third side of the rectangle, wherein the second side of the rectangle and third side of the rectangle are on opposite sides of the rectangle, and a fourth line of the rectangle corresponding to a fourth side of the rectangle indicates a rear portion of the parking spot, wherein a width of the rectangle is defined by a length of the first line, and a depth of the rectangle is at least the width of the rectangle; and
      annotating the rectangle with at least one of:
         an entrance point defined at the first side of the rectangle;
         the width of the rectangle;
         the depth of the rectangle; or
         a location of the parking spot, wherein the location of the parking spot is based on GPS data.

10. The method of claim 9, wherein the at least one sensor comprises image sensors configured to capture respective portions of the image data of an environment in which the vehicle is operating, and further comprising generating, by the system, the digital image by stitching together the respective portions of the image data.

11. The method of claim 9, wherein the at least one sensor comprises a fish-eye lens camera, and the digital image comprises a fish-eye image.

12. The method of claim 9, wherein identifying the parking spot-further comprises:
   determining whether the parking spot is occupied, wherein the determining comprises:
      in response to a first determination that the parking spot is not occupied, adding a first indication on the rectangle that the parking spot is available; and
      in response to a second determination that the parking spot is occupied, adding a second indication on the rectangle that the parking spot is not available.

13. The method of claim 9, wherein identifying the parking spot-further comprises:
   determining the depth of the rectangle based on the location of the parking spot.

14. The method of claim 9, wherein identifying the parking spot-further comprises:
   determining the depth of the rectangle based on a predefined regulation associated with a geographic region comprising the location of the parking spot.

15. A non-transitory computer-readable medium having instructions stored thereon that, in response to execution, cause a system of a vehicle to perform operations comprising:
   identifying, using a neural network, a parking spot based on a digital image generated from image data captured by at least one sensor located onboard the vehicle, wherein the identifying comprises annotating the digital image by:
      identifying, in the digital image, a first marker indicating a first side of the parking spot;
      identifying, in the digital image, a second marker indicating a second side of the parking spot;
      drawing a first line in the digital image that connects the first marker to the second marker, wherein the first line indicates an entrance to the parking spot; and
      drawing a rectangle over the parking spot, wherein the rectangle comprises four lines representing four sides of the rectangle, wherein the first line is a first side of the rectangle, a second line of the rectangle corresponding to the first marker is a second side of the rectangle, a third line of the rectangle corresponding to the second marker is a third side of the rectangle, wherein the second side of the rectangle and third side of the rectangle are on opposite sides of the rectangle, and a fourth line of the rectangle corresponding to a fourth side of the rectangle indicates a rear portion of the parking spot, wherein a width of the rectangle is defined by a length of the first line, and a depth of the rectangle is at least the width of the rectangle; and annotating the rectangle with at least one of:
- an entrance point defined at the first side of the rectangle;
- the width of the rectangle;
- the depth of the rectangle; or
- a location of the parking spot, wherein the location of the parking spot is based on GPS data.

16. The non-transitory computer-readable medium of claim 15, wherein the at least one sensor comprises image sensors configured to capture respective portions of the image data of an environment in which the vehicle is operating, and wherein the operations further comprise generating the digital image by stitching together the respective portions of the image data.

17. The non-transitory computer-readable medium of claim 15, wherein the at least one sensor comprises a fish-eye lens camera, and the digital image comprises a fish-eye image.

18. The non-transitory computer-readable medium of claim 15, wherein identifying the parking spot-further comprises:

determining whether the parking spot is occupied, wherein the determining comprises:
- in response to a first determination that the parking spot is not occupied, adding a first indication on the rectangle that the parking spot is available; and
- in response to a second determination that the parking spot is occupied, adding a second indication on the rectangle that the parking spot is not available.

19. The non-transitory computer-readable medium of claim 15, wherein identifying the parking spot-further comprises:

determining the depth of the rectangle based on the location of the parking spot.

20. The non-transitory computer-readable medium of claim 15, wherein identifying the parking spot-further comprises:

determining the depth of the rectangle based on a predefined regulation associated with a geographic region comprising the location of the parking spot.

* * * * *